Aug. 27, 1935.                C. O. SWANSON                2,012,487
                            ANTIDRIP MILK BOTTLE
                            Filed April 18, 1934

INVENTOR
CARL O. SWANSON
BY
ATTORNEY

Patented Aug. 27, 1935

2,012,487

UNITED STATES PATENT OFFICE 2,012,487

ANTIDRIP MILK BOTTLE

Carl O. Swanson, Minneapolis, Minn.

Application April 18, 1934, Serial No. 721,169

5 Claims. (Cl. 215—1)

This invention relates to improvements in molded glass bottles, particularly of the type extensively employed for domestic as well as restaurant and hotel use, for milk and cream, and the primary object is to provide means of a novel, efficient, and practical nature for preventing the drip of milk and cream from flowing down over the outer face of the bottle after part of the contents have been poured from the bottle. It is a common and well known objection or fault to milk and cream bottles of the conventional form now in use that when a part of the contents thereof is poured out the generally rounded or enlarged pouring edge causes a portion of the liquid to adhere sufficiently so that when the bottle is again righted, after each pouring, such liquid will run down the side of the bottle rendering it slippery to hold and will also invariably reach and spread under the bottle to wet up and soil the table, refrigerator shelf, or other surface upon which the bottle is set.

A further object is to provide anti-dripping means that will serve the additional purpose of so roughening or forming the bottle surface about the neck portion thereof that it will present a better grip and thus tend to prevent slipping of the bottle out of the hand.

More specifically my purpose is to provide a portion of the upper outer surface of the bottle with spaced annular ribs projecting outwardly of the normal surface, and to provide the spaces intermediate said ribs with a series of shallow recesses or corrugations with the corrugations between each pair of ribs offset with respect to the corrugations of the series immediately above or below it, and all the corrugations preferably being below the normal bottle surface, thereby creating annular channels with fluted or corrugated bottoms that are relatively or sufficiently deep to accomplish the desired effect, but yet will not extend into the bottle wall to materially weaken the structure thereof. The purpose of the channels is to catch and retain or at least to greatly retard the drops of milk or cream escaping over the pouring lip, so that such drops cannot reach the smooth surface below the ribbed surface and flow down to the support beneath. And inasmuch as the ribs are of annular horizontal formation any drops caught in the channels will also be caused to flow in an annular direction when the bottle is subsequently tilted, and this action results in the drops being spread over a greater surface to thereby expedite the evaporation thereof while such drops are still being maintained at a relatively high level. To further increase the evaporation surface the aforementioned corrugations are provided in the channels, and these corrugations not only thus accelerate evaporation but also by virtue of their relatively offset arrangement will frequently operate to split up drops of milk running down over them to thereby reduce the weight and increase the relative adhesion properties of the liquid, thus further retarding the otherwise normal gravitational pull and movement downwardly.

It may here be well to call attention to and distinguish the present invention from the one disclosed and claimed in my Patent No. 1,929,221, issued October 3, 1933, for Antidrip bottle, on an application filed May 31, 1933. In that device I provided the neck of the bottle with a reticulated surface formed by a profusely distributed series of indents into which the drops would run and be secured by surface adhesion. This structure, while operative and very efficient in use, is subject to certain objections, the principal ones of which are that with present methods there is some difficulty in cleaning the indents; indents also necessarily weaken the wall structure in view of their required depth; and lastly there is some difficulty in casting or molding a bottle of this type inasmuch as the molds, when used in registering pairs, cannot be freed from the bottle when the same is formed and in readiness to be discharged.

In other words, when a bottle of this type is formed with molds of the type now generally in use, it must have such a surface contour that the opposite mold units can be released from the bottle by movements in opposite directions. To overcome these objections and to provide the various advantages which I have already referred to, I have designed the structure illustrated in the accompanying drawing, in which—

Figure 1:
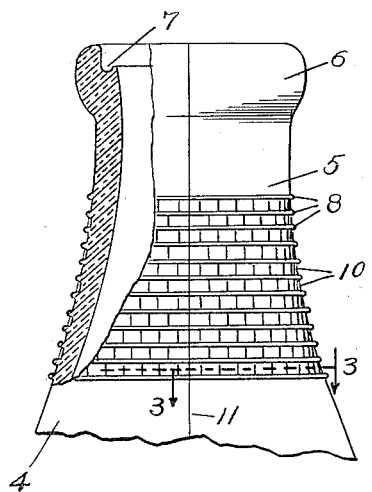
Fig. 1 is an elevation of the upper portion of a conventional type of milk bottle which embodies my invention, and which is broken away in part for purpose of illustration.
Figure 2:
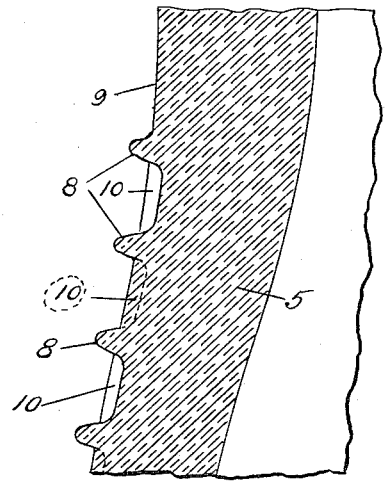
Fig. 2 is a greatly enlarged sectional detail view through a portion of the bottle neck which has been designed according to the invention as illustrated in Fig. 1.

Referring to the drawing more particularly and by reference characters, 4 designates a bottle of the type generally employed in the sale and use of milk and cream. The bottle has a relatively large body portion (here mostly omitted) and tapers upwardly into a neck portion 5, terminating in the enlarged, integral, and generally rounded pouring lip 6 having a cap receiving recess 7. The numeral 11 designates the seam formed at the juncture of the two opposed outer molds, and while this seam or ridge has no function in the present invention it is shown for the purpose of illustrating where the molds meet and thus also determine the direction of intermittent movement of the molds with respect to each other during the respected molding operations.

The ribbed and corrugated surface portion of the bottle preferably begins a short distance below the pouring lip 6, and then continues down over the neck portion substantially as indicated. The annular ribs 8 are formed integrally with the neck portion of the bottle and extend outwardly beyond the normal outer surface 9 of the bottle. These ribs, in a full sized bottle, are preferably spaced approximately one-eighth of an inch apart, as this distance has been found best for the purpose intended, inasmuch as it appears to be most efficient for the purpose of retaining or retarding the normal downward movement of the drops.

Figure 3:
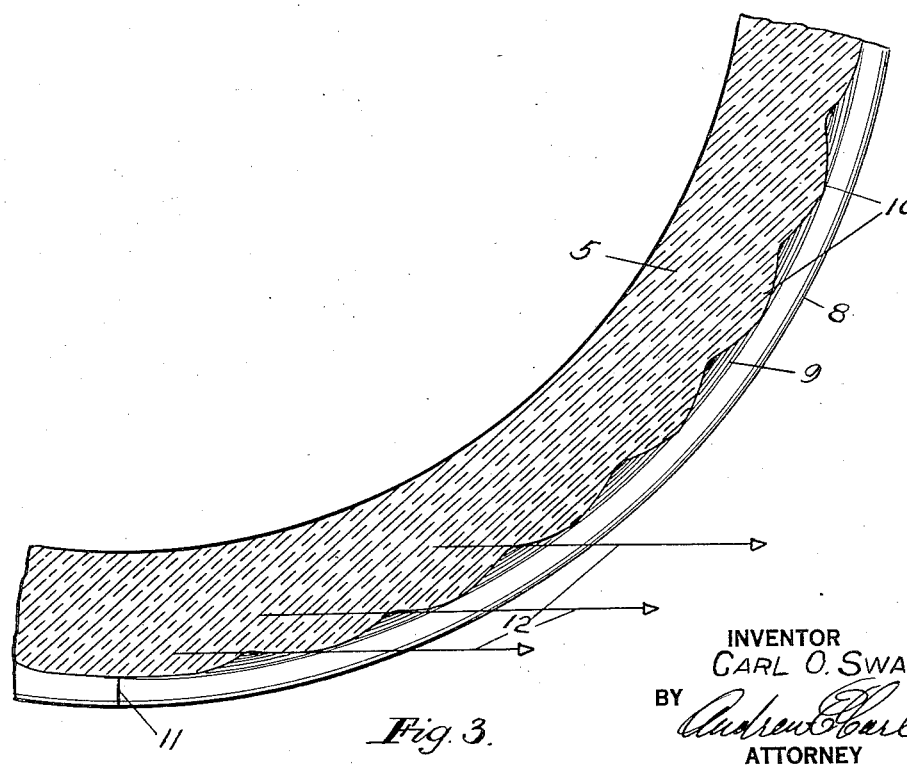
Fig. 3 is a greatly enlarged sectional detail view as shown on the line 3—3 in Fig. 1.

Extending at right angles to the annular ribs 8, the bottle neck surface is provided with corrugations 10 which may assume approximately the curvature indicated by the enlarged illustration of Fig. 3. These corrugations have a triple purpose, the first of which is to increase the surface area between the annular ribs 8 so that such areas will be substantially greater than would occur if the bottle surface between the ribs followed the normal surface line 9, as with this arrangement it will be seen that there will be presented a greater surface for the drops to adhere to, and consequently they will have a greater tendency to spread out and cause a greater evaporization surface. The second reason for the corrugations 10 is to retard the movement of the drops annularly about the bottle neck when such drops are retained by the ribs 8, and cause to flow in an annular direction when the bottle is tilted a second time. The third reason for the corrugations, and this concerns itself with the offset relationship between the corrugations of each series with those of the next adjacent series, is that when a drop of milk or cream passes down over one of the ribs 8 and contacts with a high point of a corrugation immediately below, there will be a decided tendency for the drop to divide itself into two parts; and if these parts are sufficiently great in volume to have a weight that will carry them below still another annular rib, then it will be seen that such parts will be reduced in size and will meet with the same dividing influence below as they did above, and it is of course obvious that as the drops are thus split up into smaller portions there will be a lesser tendency for them to continued downwardly, and simultaneously each liquid part thus formed will also be spread out over a wider surface area and thus be more efficiently subjected to the drying or evaporization of the drop, which takes place while the parts are thus held in contact with the surface.

Thus it will be seen that the corrugations play an important part in securing the advantages that have already been referred to. It should be noted, however, that if the corrugations 10 are of the same formation or contour at all points about the bottle neck they will interfere with the proper separation of the molds, which molds must have sufficient clearance so that they can be separated in directly opposite directions from the seam line 11; and for this reason, as clearly shown in Fig. 3, I have so designed the corrugations so that as they approach the seam line 11 they will either be slightly shallower or in any event will have to be so curved and formed that they will permit the withdrawal of the mold in a direction at right angles to the diameter passing through the same line 11. The arrows 12 shown in Fig. 3 indicate the direction of movement of the mold forming this portion of the bottle, and it will be seen from the position of the arrows that no part of the corrugations extends sufficiently into the wall of the bottle to obstruct the necessary mold movement.

The corrugations opposite the seam 11 and corresponding with the lowermost corrugations as shown in Fig. 3, as well as the corresponding corrugations at the diametrically opposed side of the bottle, will also conform to this principle so that both sides of both molds will be similarly free of obstructing contact by such corrugations. It will be seen that the recesses or lower parts of the corrugations preferably extend below the surface line 9 so as to thereby accentuate the depth of the recesses from the outer limits of the ribs 8; but it should also be noted that while the recesses of the corrugations extend below the surface line they do not do so to an extent that will appreciably weaken the strength of the bottle wall.

From the foregoing it will be seen that when one or more drops of liquid escape over the pouring lip 6 and run down to the reticulated surface, the downward movement will first be substantially retarded by the successive annular ribs 8; and as the drops come in contact with these ribs or rather with the surface between the ribs they will have a decided tendency to not only separate into parts by virtue of the high spots of the corrugations, but will flow into the annular channels formed by the ribs 8 and stay there until they have evaporated. If, before complete evaporization takes place, the bottle is again tilted, the drops will move, if at all, in the direction of the channels about the bottle until they spread over a still greater drying area; and it is found that in only extremely rare instances will any spilled liquid ever reach the lower part or parts of the ribbed and corrugated surface.

It will also be seen that although the ribs and corrugations will function in precisely the manner desired, they are so formed that they will have no objection by virtue of difficulty in making the bottle, as the parts have been so designed that conventional types of molds and machinery now in use may be employed.

It is of course understood that the type of surface created by the ribs and corrugations will so roughen the bottle neck surface that it will greatly decrease the possibility of the bottle slipping from the hand.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A milk or cream bottle having a portion of its outer neck surface provided with a series of annular ribs closely associated but vertically spaced at such intervals that the intermediately formed channels will, through surface adhesion of liquid drops coming in contact therewith, retard and laterally spread the downward flow of such drops, and permit the flow of said drops in an annular direction about the neck surface in said channels when the bottle is tilted.

2. A milk or cream bottle having a portion of its outer neck surface provided with a series of annular ribs vertically spaced at sufficiently close intervals that the intermediate channels will, through surface adhesion of liquid drops coming in contact therewith, retard and laterally spread the downward flow of such drops, but which will permit the flow of said drops in an annular direction when the bottle is tilted, said ribs projecting outwardly beyond the normal outer surface line of the bottle neck.

3. A milk or cream bottle having a portion of its outer neck surface provided with a series of annular ribs vertically spaced at such intervals that the intermediate channels will, through surface adhesion of liquid drops coming in contact therewith, retard and laterally spread the downward flow of such drops, but which will permit the flow of said drops in an annular direction when the bottle is tilted, said ribs projecting outwardly beyond the normal outer surface line of the bottle neck, and said intermediate channels having inner surface extremities extending at least in part below or inwardly of the said surface line.

4. A bottle having an outer surface portion below its pouring lip provided with vertically spaced horizontal ribs defining intermediate annular channels, with the surface between said ribs having vertical corrugations therein, said ribs extending outwardly and said corrugations being disposed inwardly with respect to the normal adjacent outer surface line of the bottle.

5. A bottle, of the type formed in two oppositely moved separable molds, and being provided with a vertically spaced series of annular ribs with vertical corrugations in the bottle surface intermediate the ribs, said corrugations extending around the bottle but those adjacent to the point of division between the molds being so formed as to form no obstruction to and provide withdrawal clearance for the molds.

CARL O. SWANSON.